(No Model.) 2 Sheets—Sheet 1.
J. S. COPELAND.
CRANK SHAFT AND BEARING FOR VELOCIPEDES.
No. 529,110. Patented Nov. 13, 1894.
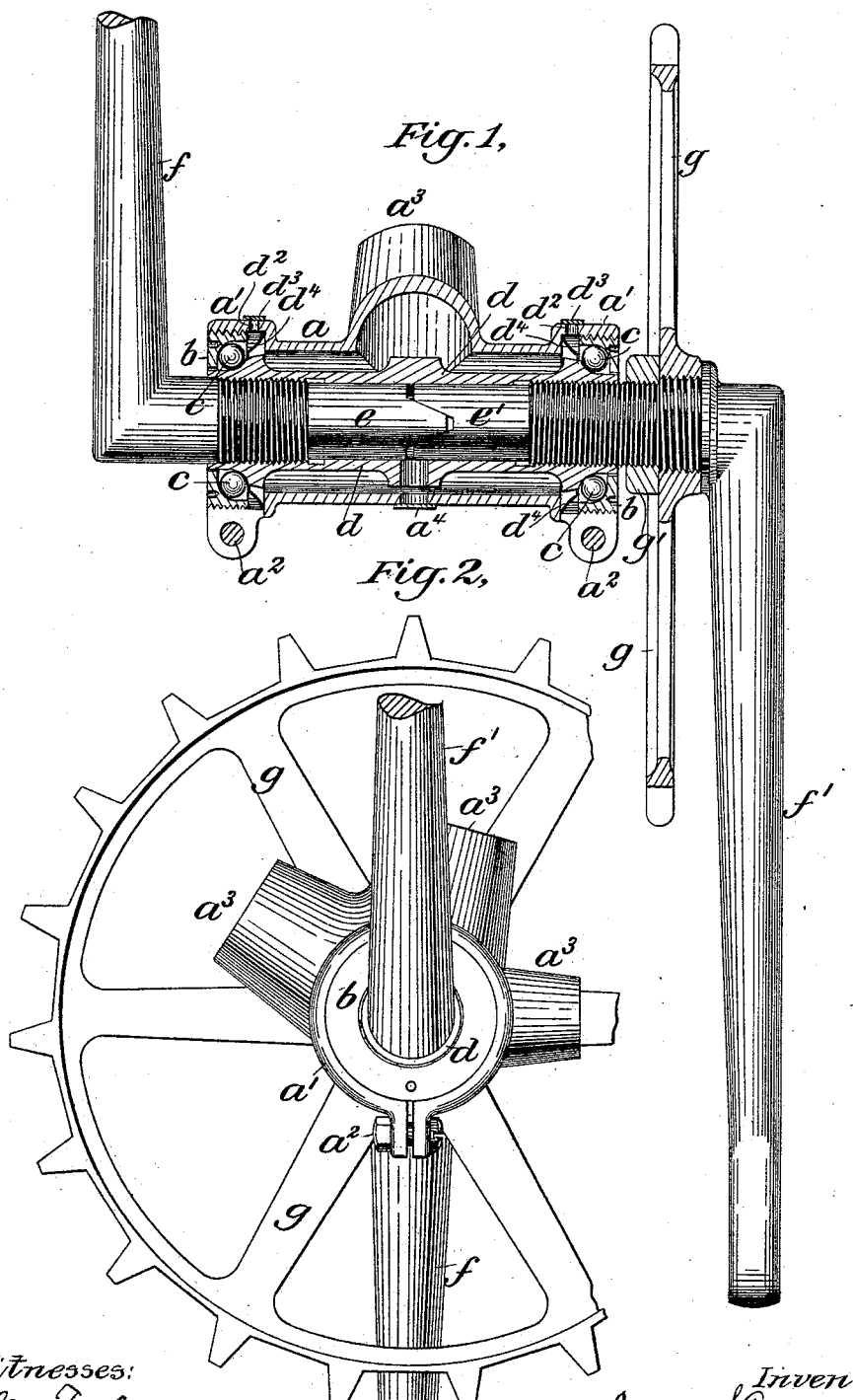
Witnesses:
E. M. Taylor.
F. M. Eggleston.
Inventor:
James S. Copeland
By Redding & Kiddle
Attys.

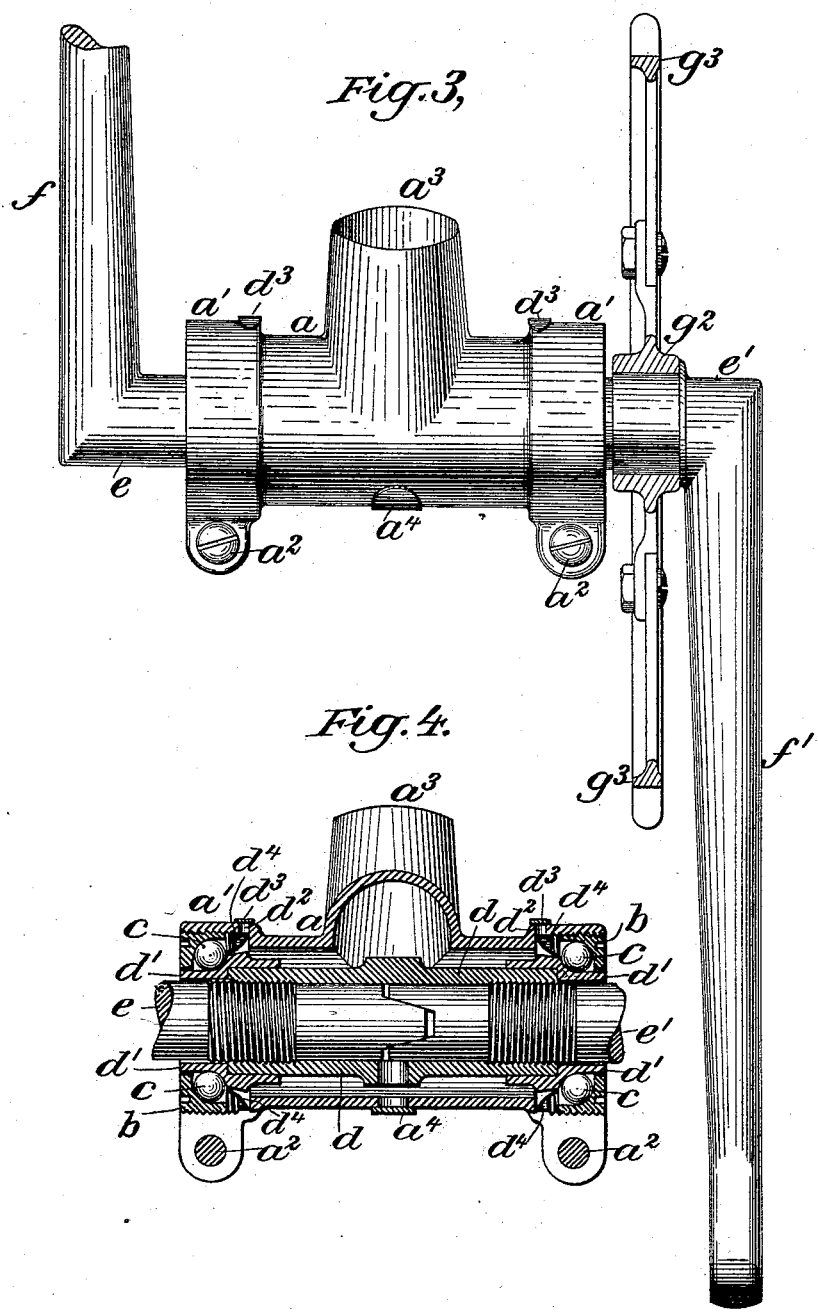

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

CRANK-SHAFT AND BEARING FOR VELOCIPEDES.

SPECIFICATION forming part of Letters Patent No. 529,110, dated November 13, 1894.

Application filed July 17, 1894. Serial No. 517,790. (No model.)

*To all whom it may concern:*

Be it known that I, JAMES S. COPELAND, a citizen of the United States, residing in the city and county of Hartford, State of Connecticut, have invented certain useful Improvements in Crank-Shafts and Bearings for Velocipedes, of which the following is a specification, reference being had to the accompanying drawings, forming part hereof.

This invention relates to crank shafts and bearings such as are usually employed in bicycles and like foot driven vehicles, and the objects of this invention are lightness, strength, simplicity of construction, and ready detachableness of parts and other advantages hereinafter set forth.

In the structure embodying this invention the crank shaft comprises two parts, and each of these two parts has a crank arm formed integral therewith or permanently secured thereto. The two parts of the crank shaft are locked together so as to be held together rotatively; and a holding device is provided for the parts of the crank shaft which permits the parts of the crank shaft to be brought together or separated by rotation relatively to said holding device, and this holding device itself constitutes or carries the journals for the bearings of the crank shaft. As a consequence of this construction the parts of the crank shaft may be readily separated by rotating them relatively to the holding device, and this separation and removal of the parts of the crank shaft does not disturb the journals and bearings of the crank shaft. These journals and bearings are so constructed that they may be readily opened or detached for cleaning or other purposes, and may be readily put together, and a simple and effective construction for permitting the ready oiling of the bearings is provided. A power transmitting device is operated by the crank shaft independently of the holding device so that rotative stress between said power transmitting device and the crank shaft does not cause rotative stress between the crank shaft and the holding device and therefore does not tend to separate the parts of the crank shaft.

According to my complete invention as it has been embodied in bicyles, screw threaded portions are formed upon each part of the crank shaft, a right hand thread on one part and a left hand thread on the other part, and the holding device comprises a reversely threaded journal sleeve having counterpart threads engaging with the threaded portions of both parts of the crank shaft, and the abutting ends of the crank shaft are shaped so that they will interlock when brought together so as to be held together rotatively, and the power transmitting device comprises a wheel, usually a sprocket wheel, secured upon the crank shaft independently of the holding sleeve.

Other features of my invention will be hereinafter set forth.

The accompanying drawings illustrate embodiments of my invention.

Figure 1 is a vertical section taken transversely of a bicyle and longitudinally of the crank shaft showing a crank shaft bracket, crank shaft and arms, and bearings and sprocket wheel, and short portions of the frame of a bicycle. Fig. 2 is an end elevation of the same. Fig. 3 is a side elevation with the sprocket wheel in section, showing a modified construction of sprocket wheel. Fig. 4 is a section similar to Fig. 1 showing a slight modification of the journal sleeve, in which the ball tracks are pressed or driven upon the reversely threaded sleeve.

The crank shaft bracket $a$ may be of any usual and suitable construction, and is shown as consisting of a tubular cylindrical casing having enlarged ends $a'$ $a'$, these enlarged ends being internally threaded to receive end bearing rings $b$ $b$, and the enlarged ends $a'$ being shown as split and provided with lugs through which are passed screws $a^2$ or which may be adjustably held by other suitable holding and clamping devices, whereby the end bearing rings may be tightly clamped in desired position. The crank shaft bracket is shown as made in one piece with or brazed to the arms $a^3$ of a bicycle frame, short sections only of said arms being shown. The end bearing rings $b$ are suitably shaped to form tracks or races for the balls $c$ of the ball-bearings of the crank shaft. The cones or ball tracks of the crank shaft journals are, in the construction shown in Fig. 1, formed upon a sleeve $d$, which sleeve has also formed upon it, and as shown at or near its ends, right and left screw threads whereby it engages with the two parts $e$ and $e'$ of the crank shaft. A slight modification of this construction is shown in Fig. 4 where the journal ball tracks are formed upon short separate tubes $d'$, which are pressed or driven upon the ends of the reversely threaded sleeve $d$.

For oiling these bearings I provide small openings $d^2$ through the upper wall of the crank shaft bracket, these openings being covered by hinged or removable caps $d^3$; and within the bore of the crank shaft bracket the cones upon the sleeve $d$ have inclined conical tables below the oil openings which act to direct the oil into the bearings; and washers $d^4$ are located within the recesses under the oil openings $d^2$ and act to direct the oil into the bearings and also to prevent the balls from becoming displaced when the end bearing rings are being attached or removed. As to the last described function of the washers $d^4$, it is to be noted that in the construction shown, when the parts are assembled and the end bearing rings $b$ are inserted in the ends of the bracket and screwed up into place, it would be difficult and troublesome, if washers such as $d^4$ were not employed, to prevent one or more of the balls $c$ from moving out of their proper positions and into improper positions between the conical tables of the bearing sleeve $d$ and the inner periphery of the bracket; but the washers $d^4$ guard the recess and prevent any of the balls from leaving their proper positions and entering between the conical tables and the inner periphery of the bracket, and hold the balls back in their proper positions until the balls are properly engaged by the bearing rings $b$. This construction is exceedingly simple and inexpensive and of light weight and as a result of this construction the bearing may be readily taken apart or adjusted without displacement of the balls or jamming of the balls into improper positions. The adjustability of the ball bearings of the crank shaft is provided for by these end bearing rings, small depressions or sockets being formed in the faces of these end bearing rings to permit them to be gripped by a suitable key or wrench having projecting pins, the clamping screws of the split enlarged ends $a'$ of the bracket being adapted to be loosened to permit this adjustment.

The two part crank shaft $e\,e'$ is firmly held within the reversely threaded journal sleeve $d$ by means of the right hand screw thread on one part and the left hand screw thread on the other part, these threaded portions meshing into the corresponding screw threads of the sleeve $d$, and an interlocking joint is formed between the two parts of the crank shaft. This interlocking joint is so constructed as to hold the two parts of the crank shaft together rotatively, or so that the rotation of one will necessarily cause a corresponding rotation of the other, and this interlocking joint is shown as formed by a projecting tongue upon the inner end of the part $e$ of the crank shaft, and a counterpart depression or groove in the inner end of the part $e'$ of the crank shaft. The cranks $f\,f'$ are formed in one piece with their corresponding parts of the crank shaft and thus the usual joint between the crank and crank shaft is obviated and a very considerable saving in weight of material is effected as well as a decided gain in the light and graceful appearance of the crank. It is of course evident that this construction may be departed from by mounting the cranks upon the crank shaft in any usual manner, and when this is done the crank may be brazed or shrunk or otherwise permanently secured upon the crank shaft.

The crank and crank shafts may be readily inserted or removed by screwing them in or out of the reversely threaded sleeve, but before this can be accomplished it is necessary to control the movements of said sleeve and this is shown as provided for by forming one or more depressions or sockets in said sleeve adapted to receive a pin, and forming a suitable opening through the crank shaft bracket, and this opening is shown as covered by a cap $a^4$ to exclude dust, this cap being pivoted or otherwise held so that it may be moved aside or removed at will, and when it is desired to attach or remove the parts of the crank shaft, a suitable pin is inserted through the opening in the crank shaft bracket and into the pin hole or socket of the sleeve $d$. If the operation is that of removing the cranks they may then be readily unscrewed and the operator may grasp both cranks and will thus be supplied with arms affording him the desired leverage for readily manipulating the parts of the crank shaft. When the two parts of the crank shaft are to be inserted these two parts are started from opposite ends of the sleeve at the same time and maintained in their proper relative positions and rotated together. As the two parts being screwed into the sleeve approach each other, their ends will interlock, and they will assume their proper working position. The operation of screwing together the parts may be continued until they are very tightly clamped together. Then the pin holding the reversely threaded sleeve can be removed and the parts will be firmly held together and cannot be separated or loosened except by holding the sleeve $d$ as before, and reversing the operation just described. It will be observed that this attachment or removal of the parts of the crank does not disturb the bearings or journals of the crank shaft and that the reversely threaded journal sleeve is rigidly held in fixed position by its bearings and by the pin inserted in a socket in the sleeve, so that no other manipulation or holding thereof is necessary in attaching and removing the parts of the crank shaft.

The power transmitting wheel, shown in the drawings as a sprocket wheel, is mounted upon one of the parts of the crank shaft independently of the reversely threaded sleeve, and thus the rotative strains to which the connection between this sprocket wheel and the crank shaft is subjected, do not in any degree affect the devices for holding together the two parts of the crank shaft. In the construction shown in Figs. 1 and 2, the sprocket wheel $g$ is shown as made of one piece and screwed upon an enlarged screw-threaded portion of the part of the crank shaft $e'$ and up against a shoulder or collar formed upon said part of the crank shaft, and the sprocket wheel is tightly held from unscrewing by means of the lock nut $g'$ which screws up against the hub of the sprocket wheel $g$, on a continuation of the thread of the part $e'$ that engages with one of the threads of the journal sleeve, and the thread on which the hub of the sprocket wheel is screwed is arranged in the reverse direction to this thread of the lock nut $g'$ so that the tendency to loosening of one part tends to tighten the other, and the parts are therefore very tightly held together. This construction is simple and secures the desired detachableness of the sprocket so that gears of other sizes may be substituted when desired.

A modified construction is shown in Fig. 3 in which the hub $g^2$ of the sprocket wheel is permanently secured as by brazing upon one of the parts of the crank shaft, while the rim $g^3$ of the sprocket wheel is made detachable in the manner now usually employed, that is to say, by holding together by detachable fastening devices spokes or arms projecting from the rim, and spokes or arms projecting from the hub.

In practical trials of bicycles embodying my invention it has been discovered that under the intermittent and varying strains to which the cranks are subjected (the operator usually exerting the power of his legs by successive downward pushes of varying strength alternately applied first on one crank and then on the other) the slight spring of the crank shaft between the points where its threads are held causes a small and in fact almost infinitesimal rotative twisting of the threads relative to the journal sleeve, and that the constant repetition of this slight twisting movement in rapid succession, because of the speed of the ordinary movement of these parts, will in the course of a long ride and in the event that its tendency is to unscrew the parts of the crank shaft out of the journal sleeve, cause a slight unscrewing or separation of the parts of the crank shaft; and I have also discovered that when the thread on the right part of the crank shaft is a right hand thread and that on the left part of the crank shaft is a left hand thread, the tendency of this exceedingly slight twisting movement is to screw the parts of the crank shaft tightly together or in any event that there is no tendency to unscrew the parts of the crank shaft, and that when the parts are thus constructed and arranged the parts of the crank shaft will not work loose and if not properly screwed up or tightened will become tightened in sufficiently long usage. This is the construction shown in the drawings, Figs. 1 and 3 being views in which the observer is supposed to be looking toward the rear of the bicycle.

In constructions embodying this invention the tread may be made quite narrow, and this is a feature of considerable importance, as thereby the feet are brought more closely together and approach more nearly the natural position in walking and the power of the rider is exerted more effectually upon the pedals. The ready detachableness of parts is also an advantageous feature, especially as it is at times desirable to clean the bearings. The construction of oiling device is highly effective and acts to direct the oil and confine it to the bearings, where alone it is desired, and to keep it away from other parts of the crank shaft and bracket. The construction is also exceedingly strong and simple and may be made of extremely light weight.

It is of course evident that various modifications may be made in the construction and arrangement of various parts, and that parts of my invention may be used separately, or in combination with other parts of different construction. I do not, therefore, limit my invention to the specific construction herein shown and described, but

What I claim, and desire to secure by Letters Patent, is—

1. The combination of a crank shaft comprising two parts, and means for detachably holding together said parts of the crank shaft whereby the parts of the crank shaft may be brought together or separated by rotation relatively to said holding means, and journals for said crank shaft upon said holding means, and suitable bearings for said journals, substantially as set forth.

2. The combination of a crank shaft comprising two parts adapted to be locked so as to be held together rotatively, a power transmitting device upon said shaft, and means for holding together said parts of the crank shaft whereby the parts of the crank shaft may be brought together or separated by rotation relatively to said holding means, said holding means being connected to the crank shaft independently of the power transmitting device, and journals for said crank shaft upon said holding means, and suitable bearings for said journals, substantially as set forth.

3. The combination of a crank shaft comprising two parts, each of said parts having a crank arm integral therewith, and said parts adapted to be locked so as to be held together rotatively, and each of said parts containing a screw threaded portion, the screw thread of one part being in the reverse direction to that of the other part, and a holding device provided with reverse threads engaging with the threads of both parts of the crank shaft, and journals for the crank shaft upon said holding device, and suitable bearings for said journals, and a power transmitting device operated by said crank shaft independently of said holding device, substantially as set forth.

4. The combination of a crank shaft comprising two interlocking parts so shaped at their interlocking joint that the parts when interlocked are compelled to rotate together, each of said parts containing a screw threaded portion, the screw thread of one part being in the reverse direction to that of the other part, and a reversely threaded journal sleeve for the crank shaft engaging with the threads of both parts of the shaft, and suitable bearings for said sleeve, substantially as set forth.

5. The combination of a crank shaft comprising two interlocking parts so shaped at their interlocking joint that the parts when interlocked are compelled to rotate together, each of said parts containing a screw threaded portion, the screw thread of the right hand part being in a right hand direction, and that of the left part in a left hand direction, and a reversely threaded journal sleeve for the crank shaft engaging with the threads of both parts of the crank shaft, and suitable bearings for said sleeve, and a power transmitting device operated by said crank shaft independently of said journal sleeve, substantially as set forth.

6. The combination of a crank shaft comprising two parts adapted to be locked so as to be held together rotatively, each of said parts containing a screw threaded portion, the screw thread of one part being in the reverse direction to that of the other part, a crank shaft bracket, removable bearing rings adjustably screwed into the ends of said bracket, a journal sleeve, and bearing balls located between said journal sleeve and the bearing rings, said journal sleeve being reversely threaded and engaging with the threads of both parts of the crank shaft, and a power transmitting device operated by said crank shaft independently of said journal sleeve, substantially as set forth.

7. The combination of the crank shaft comprising the two reversely threaded parts $e$ and $e'$ and crank arms integral therewith, the reversely threaded journal sleeve $d$, engaging with both parts of the crank shaft, a power transmitting wheel secured upon one of the parts of the crank shaft, the crank shaft bracket $a$ having split ends $a'$ and oiling openings $d^2$, the bearing rings $b$ adjustably screwed into the ends $a'$ of the crank shaft bracket, and clamping devices for tightening the ends $a'$ upon said bearing rings, the bearing balls $c$ between said bearing rings and the journals upon the sleeve $d$, and the washers $d^4$ located in recesses at the inner ends of the bearing rings $b$, substantially as set forth.

8. The combination of a crank shaft, the crank shaft bracket $a$ having split ends $a'$ and oiling openings $d^2$, the removable bearing rings $b$ adjustably screwed into the ends $a'$ of the crank shaft bracket, and clamping devices for tightening the ends $a'$ upon said bearing rings, journal cones upon said crank shaft, and bearing balls located between said journal cones and bearing rings, inclined conical surfaces or tables upon said journal cones sloping toward the bearings, and the washers $d^4$ located in recesses at the inner ends of the bearing rings $b$, substantially as set forth.

This specification signed and witnessed this 11th day of July, A. D. 1894.

JAMES S. COPELAND.

In presence of—
FELTON PARKER,
ALVIN W. COMSTOCK.